May 30, 1933.   J. H. TAYLOR   1,911,654
SWEEP WELDING OUTLET
Filed May 19, 1932   2 Sheets-Sheet 1
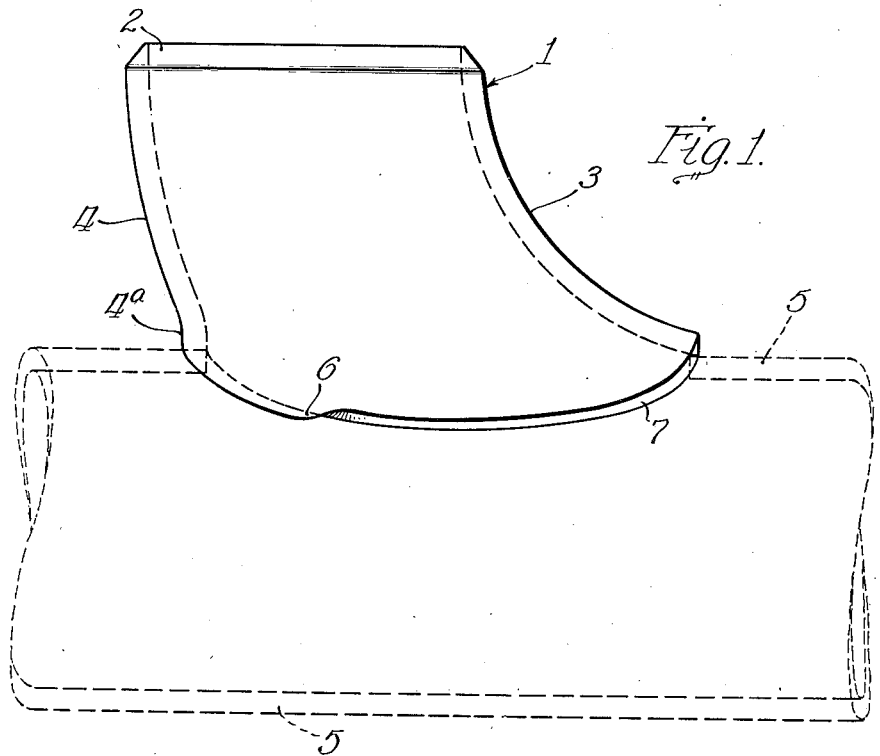
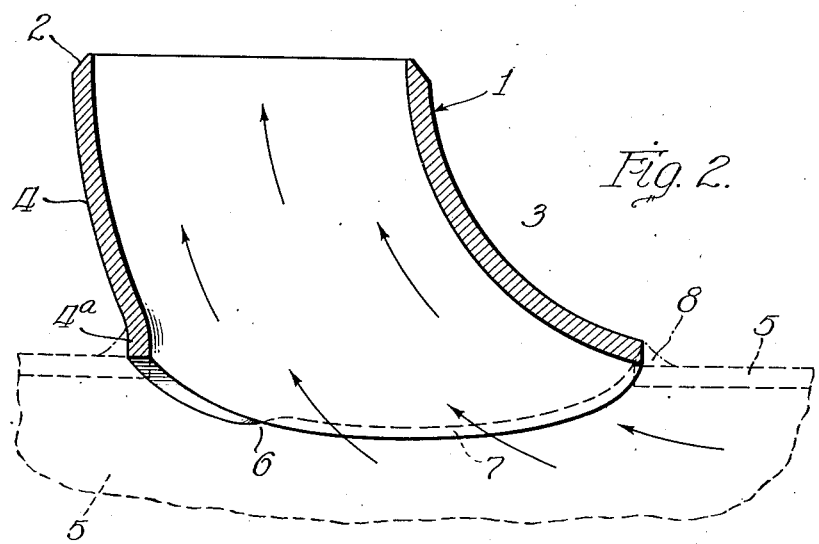
Inventor:
James Hall Taylor
By: Brown, Jackson, Boettcher & Dienner,
Attys.

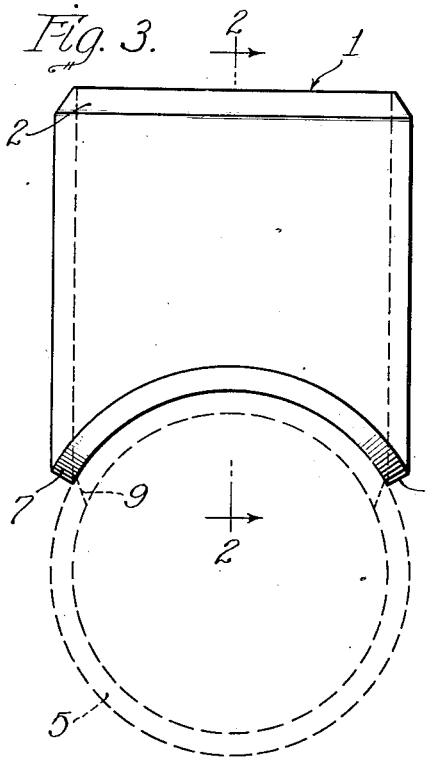
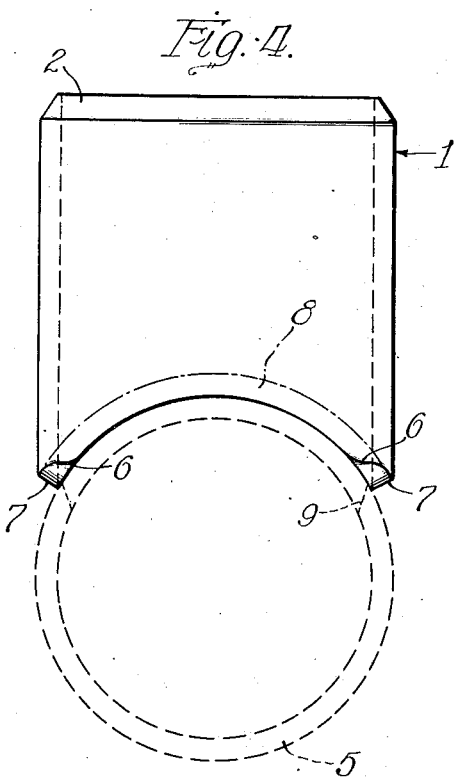
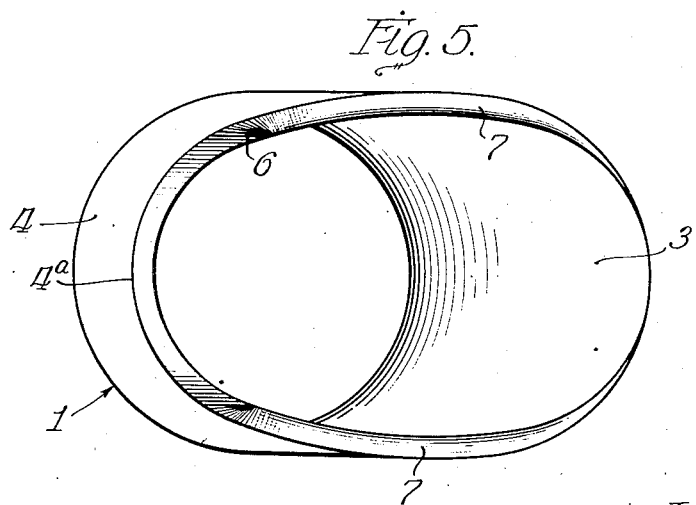

Patented May 30, 1933

1,911,654

UNITED STATES PATENT OFFICE

JAMES HALL TAYLOR, OF OAK PARK, ILLINOIS

SWEEP WELDING OUTLET

Application filed May 19, 1932. Serial No. 612,264.

This invention relates to pipe fittings and analogous articles, and has to do with a sweep outlet adapted for seating upon and welding to a pipe or similar cylindrical article for providing a sweep outlet therefrom curved in one direction.

Outlets of the character referred to are intended for use in pipe lines and for analogous purposes, and are ordinarily formed by the man on the job, by cutting an elbow across the bend thereof and to conform more or less to the curvature of the pipe. The fitting thus produced is curved in one direction lengthwise of the pipe, and the pipe is curved circumferentially, i. e., in a plane at right angles to the plane of curvature of the fitting. This renders it extremely difficult to obtain a proper juncture between the fitting and the pipe. Also, in a fitting made in this manner, the wall at one side of the fitting is curved inwardly and the wall at the opposite side is curved outwardly. When the fitting is applied to the pipe, the outwardly curved wall thereof forms a small acute angle with the pipe about a considerable portion of the perimeter of the fitting. It is impossible to obtain proper flow of the welding metal into this acute angle. As a result, proper union between the pipe and the fitting, where this acute angle occurs, is impossible, and the weld is mechanically weak and leakage quickly develops at the area thereof corresponding to the acute angle referred to. The making and applying of a fitting in this manner is difficult, time consuming and altogether unsatisfactory, and, at best, is a patchwork job.

The primary object of my invention is to provide, as a standardized article of manufacture, a sweep outlet fitting of the character stated which obviates the objections to the present practice above briefly described, and which can be expeditiously and economically welded to a pipe or the like. A further object is to provide a fitting of this type adapted at one end to fit accurately upon and about the pipe and presenting, throughout substantially the entire perimeter of said end, welding surfaces so disposed relative to the pipe as to permit effective welding of the fitting to the pipe with facility and expedition, while assuring a mechanically strong and leak-proof weld therebetween. Further objects and advantages of my invention will appear from the detail description.

In the drawings:—

Figure 1 is an elevation of the fitting of my invention positioned for welding relative to a pipe, the pipe being shown in dotted lines;

Figure 2 is a section taken substantially on line 2—2 of Figure 3;

Figure 3 is a side view of the fitting, applied to the pipe, looking at the inwardly curved side of the fitting;

Figure 4 is a side view of the fitting, applied to the pipe, looking at the outwardly curved side of the fitting;

Figure 5 is an underneath view of the fitting.

The fitting 1 of my invention, preferably formed of wrought metal particularly adapted for welding, is beveled at one end, at 2, for welding to a similarly beveled end of a pipe, in a manner known in the art. Side 3 of the fitting is curved inwardly and is flared away from outwardly curved side 4 to provide an outlet from a pipe to which the fitting is applied, which outlet curves in one direction and permits free flow of fluid from the pipe into the fitting.

The other end of the fitting is shaped to conform to a segment of a cylinder or pipe 5 to which the fitting is to be applied. The wall at side 4 of the fitting and extending for a short distance from and about the flared end thereof is bent outwardly to provide a portion 4a which is straight lengthwise of the fitting. Portion 4a is thus disposed radially of the pipe 5 with the edge of this portion tangent to and seating upon the outer surface of the pipe. The remainder of the wall at the flared end of the fitting, with the exception of two intermediate portions 6 of but little length, is so disposed that the inner surface thereof seats upon pipe 5, edge 7 of the fitting wall being exposed and extending approximately at right angles ot or radially of the pipe. The flared end of the fitting comprises one portion disposed to seat edgewise upon the pipe, a second portion so disposed that the inner surface of this second portion seats upon the pipe with the edge of such second portion exposed and substantially radial to the pipe, and two intermediate portions of slight length connecting the first portion and the second portion. Viewed in plan, the flared end of the fitting is of elliptical shape, the side thereof opposite the flare and which coincides with portion 4a of the wall, being approximately coincident with the corresponding arc of the cylindrical portion of the fitting beyond the flared end portion thereof.

In the use of my fitting, the pipe 5 is first provided with a suitable opening 9. The fitting is then positioned upon the pipe so as to seat thereon about the opening, as in Figure 3. Portion 4a of the fitting seats upon the pipe edgewise with the outer face of the fitting making line contact with the pipe. The remainder of the wall at the flared end of the fitting with the exception of the portions 6, seats upon the pipe with the inner face of the fitting in contact with the pipe and the edge 7 exposed and extending approximately radial of the pipe. The fitting thus provides, for approximately the full perimeter of the flared end thereof, welding surfaces which are disposed radial to the pipe so as to be arranged at approximately right angles thereto. This greatly facilitates the welding operation and assures a fluid tight and pressure resistant connection between the fitting and the pipe.

After being properly positioned upon the pipe, the fitting is welded thereto, as indicated at 8 and in a known manner. During the welding operation, extra metal may be welded in at the portions 6 so as to fill completely any gap existing between the wall of the fitting 3 and the surface of the pipe.

The fitting illustrated is intended for use with a pipe of the diameter illustrated. This fitting, in practice, will be made of various sizes to accommodate pipes of different diameters, but is, in each instance, the same in all essential respects as the fitting herein disclosed.

What I claim is:—

1. As a new article of manufacture, a wrought metal sweep outlet fitting for welding to a pipe, said fitting being flared outwardly and toward one end at one side providing an outlet opening from the pipe curved in one direction and the opposite side of the fitting being without appreciable flare, the wall at said end of the fitting being shaped to provide two portions, one extending part way of the periphery of the fitting end and disposed to seat edgewise upon the pipe substantially radial thereto, the other portion comprising substantially the remainder of the periphery of said end of the fitting and being disposed to seat with its inner surface upon the pipe and the edge of its wall exposed and approximately radial to the pipe.

2. As a new article of manufacture, a wrought metal sweep outlet fitting for welding to a pipe, said fitting being flared outwardly and toward one end at one side providing an outlet opening from the pipe curved in one direction and the wall at the opposite side and for a short distance along said end of the fitting being straight lengthwise of the fitting, the straight portion of the wall being disposed to seat edgewise upon the pipe substantially radial thereto, the wall at said end of the fitting and beyond said straight portion being shaped to seat upon the pipe with its inner surface in contact with said pipe and its edge exposed and approximately radial to the pipe.

3. As a new article of manufacture, a wrought metal sweep outlet fitting for welding to a pipe, said fitting being flared outwardly and toward one end at one side providing an outlet opening from the pipe curved in one direction, the fitting being of approximately circular cross-section beyond the flared portion thereof and said end of the fitting being of approximately elliptical shape in plan with the end of the ellipse opposite said side of the fitting substantially coincident with the arc of the circular portion of the fitting, the flared end of the fitting being shaped to seat upon and about the pipe with a portion of the wall seating edgewise upon the pipe and approximately radial thereof and substantially the remainder of the wall with its inner surface in contact with the pipe and its edge exposed and approximately radial to the pipe.

4. As a new article of manufacture, a wrought metal sweep outlet fitting for welding to a pipe, said fitting being flared outwardly at one side and the opposite side of the fitting being without appreciable flare, the end of the fitting being shaped to provide two portions, the portion at said latter side being disposed to seat edgewise upon the pipe, the other portion comprising substantially the remainder of the periphery of said end being disposed to seat with its inner surface upon the pipe and the edge of its wall exposed and approximately radial to the pipe.

In witness whereof, I hereunto subscribe my name this 16th day of May, 1932.

JAMES HALL TAYLOR.